June 22, 1926.
H. C. LONG
GATE
Original Filed March 30, 1925   2 Sheets-Sheet 1
1,590,102
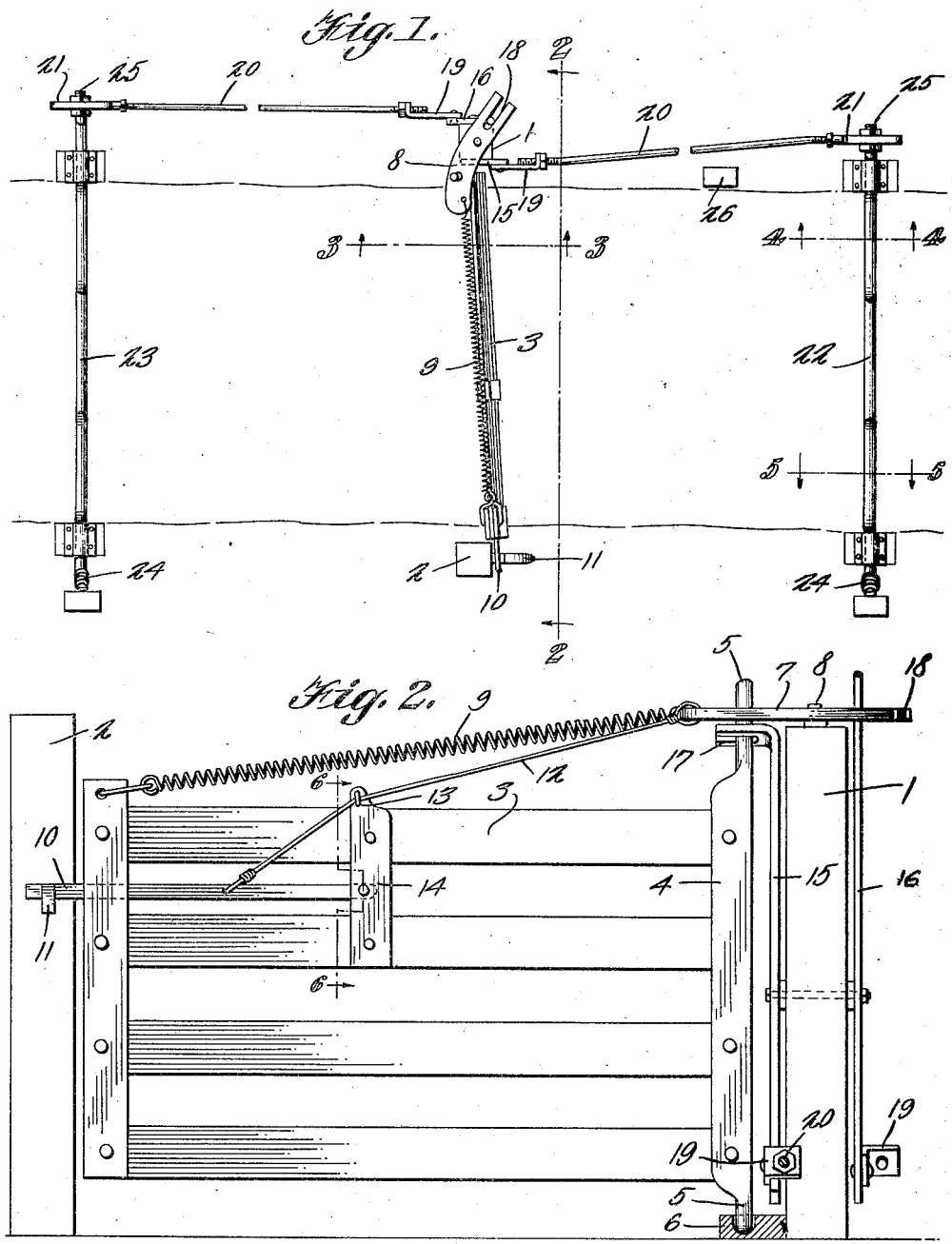

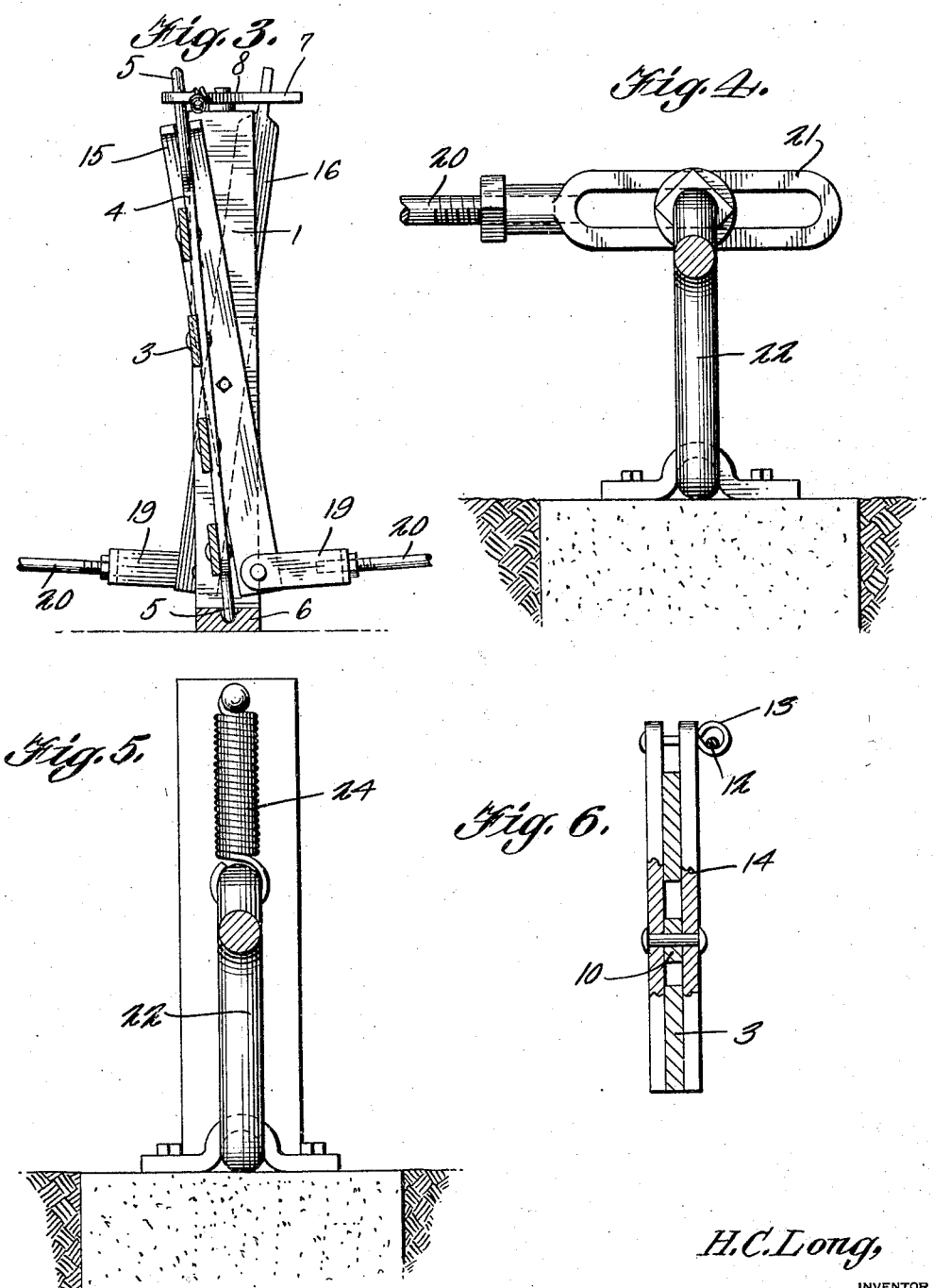

Patented June 22, 1926.

1,590,102

UNITED STATES PATENT OFFICE.

HENRY C. LONG, OF CABALLO, NEW MEXICO.

GATE.

Application filed March 30, 1925, Serial No. 19,416. Renewed March 16, 1926.

This invention relates to a gate for highways and the like, the general object of the invention being to provide means adapted to be struck by the wheels of a vehicle for opening the gate to permit the vehicle to pass through and other means actuated by the wheels of a vehicle for closing the gate after it has passed beyond the gate.

A further object of the invention is to so arrange the parts that the gate is tilted by the operating means so that it will open and close under the action of gravity.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:

Figure 1 is a plan view of the invention.

Figure 2 is a section on line 2—2 of Figure 1.

Figure 3 is a section on line 3—3 of Figure 1.

Figure 4 is a section on line 4—4 of Figure 1.

Figure 5 is a section on line 5—5 of Figure 1.

Figure 6 is a section on line 6—6 of Figure 2.

In these views, 1 and 2 indicate the gate posts and 3 indicates the gate for closing the space between the posts. This gate has its rear upright 4 formed with reduced ends 5, the lower one of which engages a socket in a base piece 6 and the upper one of which passes through a hole in a rocking arm 7 which is pivotally connected with the top of the post 1, as shown at 8. Thus by rocking the arm 7 on its pivot the gate will be tilted so that it will open under the action of gravity and then by rocking the arm 7 in the opposite direction the gate will be tilted in the other direction so that it will swing shut under the action of gravity. A spring 9 connects the outer end of the gate with the arm 7 for facilitating its opening and closing movement and a latch bar 10 is arranged on the gate for engaging a keeper 11 on the post 2 for holding the gate closed. A cable 12 connects the latch bar with the arm 7 and said cable passes through a guiding eye 13 on the upper end of the vertical members 14 of the gate, these parts being arranged so that when the arm 7 is rocked to open the gate it will first exert a pull upon the cable so as to lift the latch bar 10 out of the keeper 11.

A vertically arranged lever 15 is pivoted to the front face of the post 1 and a similar lever 16 is pivoted to the rear face thereof. The upper end of lever 15 is bent at right angles and slotted, as at 17, to receive the upper end of the upright 4, and the upper end of the lever 16 is reduced and passed through a slot 18 formed in the rear end of the arm 7. Thus the rocking movements of levers 15 and 16 will be communicated to the arm and when said arm is moved by one lever it will cause the other lever to also be moved. An angle bracket 19 is connected to the lower end of each lever and a rod 20 is connected with each bracket. One rod extends in one direction from the gate and the other in an opposite direction. The outer end of each rod is connected to a slotted member 21. A crank shaft 22 is arranged across the road at one side of the gate and a similar shaft 23 is arranged across the road at the other side of the gate, the cranks of these shafts being positioned so that they will be struck by the wheels of a vehicle passing along the road. Each shaft is held by a spring 24 with its cranks in an upright position and each shaft has a cranked end 25 which engages the slot in the member 21.

From the foregoing it will be seen that when a vehicle approaches the gate its wheels will strike the cranks of shaft 22 and thus cause the shaft to rotate a quarter turn until its cranks strike the road. This will cause the cranked end 25 to engage the inner end of the slot in the member 21 so that said member and the rod 22 is moved longitudinally towards the gate which will exert pressure on the lower end of lever 15, causing the same to rock on its pivot and cause the arm 7 to tilt the gate 3 through means of the upright 4 so that it will swing into open position under the action of gravity. A post 26 limits the opening movement of the gate. The vehicle can then pass through the gate opening and after it has passed through its wheels will strike the shaft 23 so as to tilt the same and this movement will be communicated to the lever 16 through the member 21 and shaft 20 so as to rock the arm 7 in an opposite direction and thus cause the gate to swing shut under the action of gravity. The slots in the members 21 will permit movements of one crank shaft and the gate without movement of the other crank shaft and I connect said members 21 with the rods 10 by screw threads so that they can be adjusted to secure the proper movements of the parts.

It will thus be seen that I have provided simple and inexpensive means for automatically opening and closing a gate so that it is not necessary for the occupants of a vehicle to leave a vehicle to open and close the gate. While the drawings show the invention as used for opening and closing a gate it will of course be understood that it can be used for opening and closing garage doors and the like.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

Barrier operating means comprising a post, a base adjacent the post having a socket therein, a barrier having a depending projection at its rear end engaging the socket and an extension at the upper part of its rear end, a horizontal arm pivoted to the post and having a hole therein receiving the extension, a pair of vertically arranged levers on the posts, one of which engages the extension and the other the rear end of the arm, vehicle operated means at each side of the barrier and means for connecting such means with the lower ends of the levers.

In testimony whereof I affix my signature.

HENRY C. LONG.